United States Patent [19]

Abler et al.

[11] Patent Number: 5,413,526
[45] Date of Patent: May 9, 1995

[54] SOLID COOLANT INSERTER

[75] Inventors: Norman C. Abler, Madison; Gary R. Skaar, Marshall; William Paulos, McFarland, all of Wis.

[73] Assignee: Oscar Mayer Foods Corporation, Madison, Wis.

[21] Appl. No.: 203,160

[22] Filed: Feb. 28, 1994

[51] Int. Cl.⁶ .............................................. A22B 5/00
[52] U.S. Cl. .................................... 452/176; 452/198
[58] Field of Search ................ 452/176, 198; 128/260, 128/263

[56] References Cited

U.S. PATENT DOCUMENTS

| 2,784,682 | 3/1957 | Clevenger . | |
| 3,113,530 | 12/1963 | Vestermark . | |
| 3,498,797 | 3/1970 | Miller | 99/107 |
| 3,535,998 | 10/1970 | Perkins et al. | 99/256 |
| 3,817,248 | 6/1974 | Buckers et al. | 128/260 |
| 3,863,556 | 2/1975 | Townsend | 99/487 |
| 3,932,155 | 1/1976 | Pietrucha et al. | 62/10 |
| 4,065,830 | 1/1978 | Pfatischer | 99/494 |
| 4,142,000 | 2/1979 | Townsend | 426/281 |
| 4,177,810 | 12/1979 | Gourlandt | 128/218 A |
| 4,178,660 | 12/1979 | Olney et al. | 99/532 |
| 4,211,160 | 7/1980 | Bieser | 99/494 |
| 4,220,669 | 9/1980 | Townsend | 426/281 |
| 4,230,732 | 10/1980 | Paradise, Jr. et al. | 426/393 |
| 4,254,151 | 3/1981 | Townsend | 426/231 |
| 4,292,889 | 10/1981 | Townsend | 99/533 |
| 4,361,150 | 11/1982 | Voss | 128/263 |
| 4,516,578 | 5/1985 | Shuffield | 128/341 |
| 4,758,227 | 7/1988 | Lancaster, Jr. et al. | 604/144 |
| 4,799,921 | 1/1989 | Johnson et al. | 604/51 |
| 5,085,615 | 2/1992 | Gundlach et al. | 452/198 |
| 5,114,380 | 5/1992 | Larsen | 452/176 |
| 5,120,266 | 6/1992 | Aubert | 452/176 |
| 5,176,645 | 1/1993 | Guerrero | 604/70 |

Primary Examiner—Willis Little
Attorney, Agent, or Firm—Lockwood, Alex, Fitzgibbon & Cummings

[57] ABSTRACT

Charges of solid coolant are automatically inserted into a fresh animal carcass or a portion of an animal carcass by the use of an inserting tool. The solid coolant charge is contained within a compartment of the tool which also includes a flat spear blade. When the blade forms a slit in a selected muscle area, the solid coolant charge is positively, rapidly and consistently positioned within the pocket that had just been opened by the spear blade. The insertion tool and process are especially well-adapted for use in reducing the development of pale, soft and exudative meat, while accomplishing this in a manner that is rapid and minimizes variations from carcass to carcass.

32 Claims, 5 Drawing Sheets

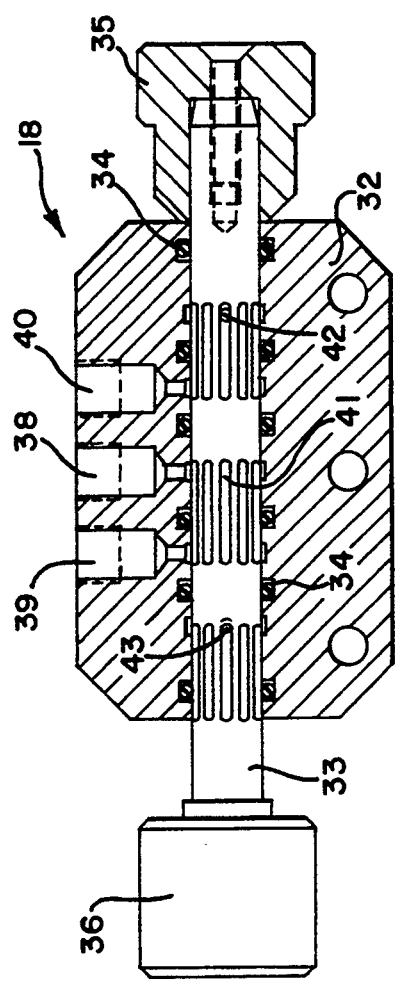
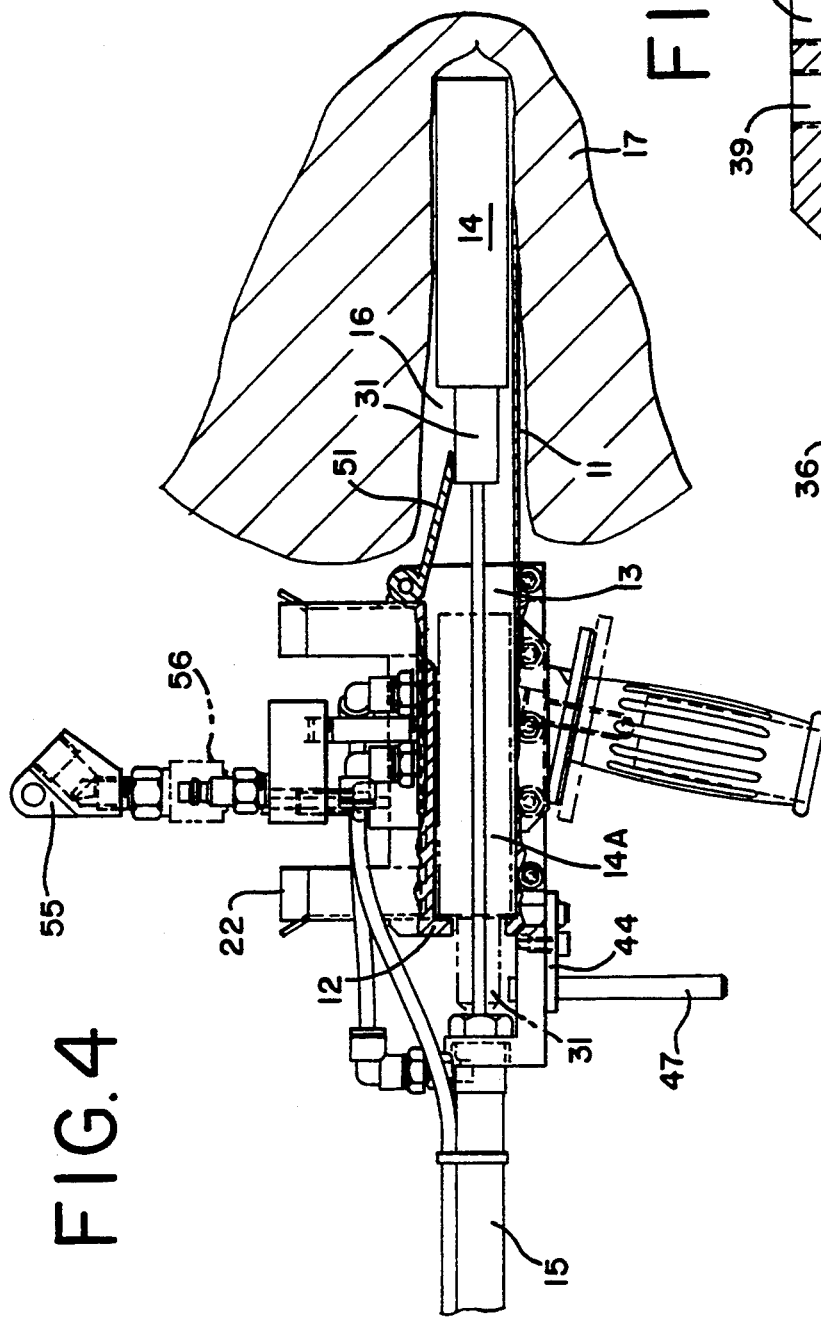

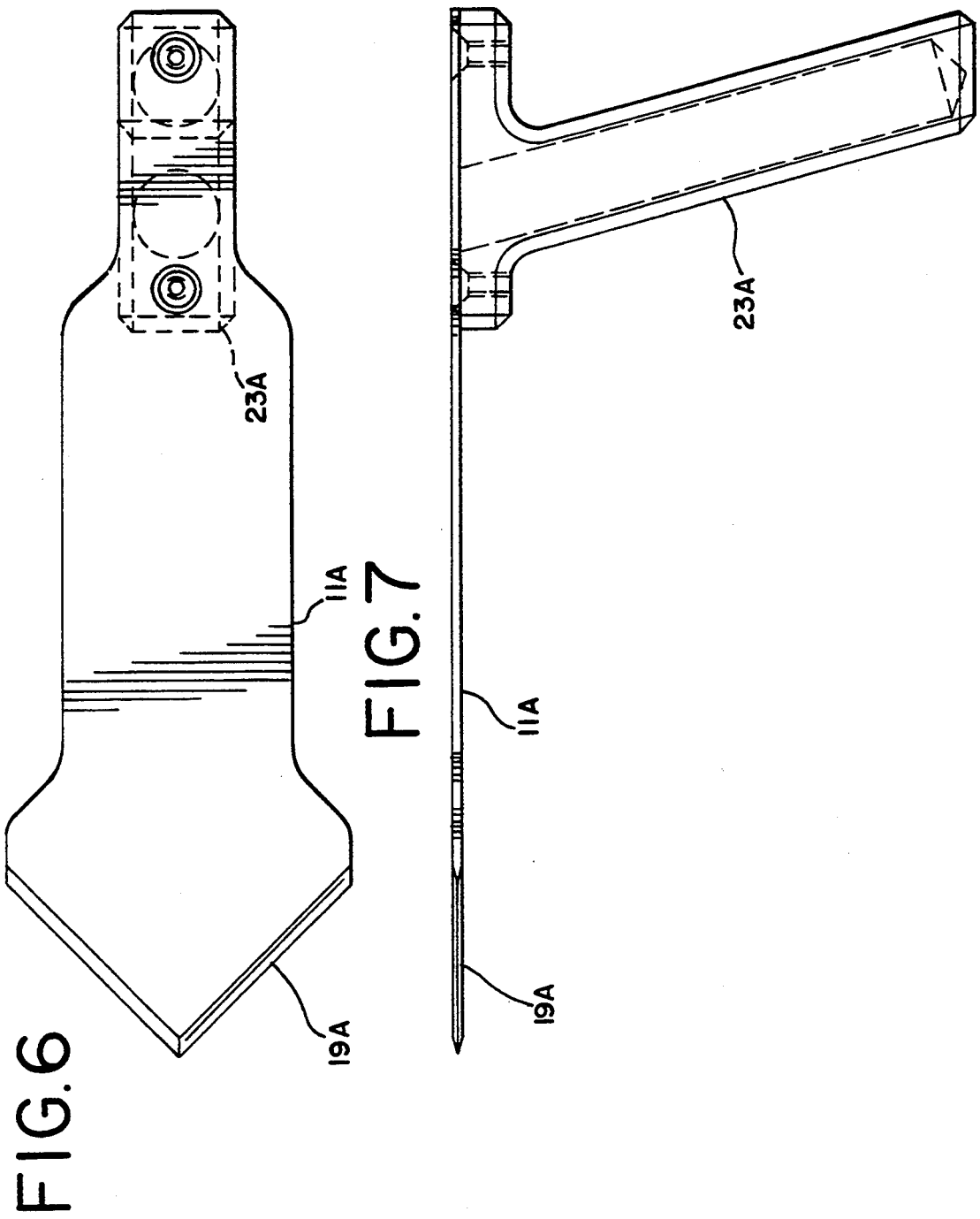

SOLID COOLANT INSERTER

BACKGROUNDS AND SUMMARY OF THE INVENTION

The present invention generally relates to an inserter tool useful in processing of raw meat, especially during the early stages of slaughtering operations. More particularly, the invention relates to a tool and method for inserting a quantity of solid coolant or solid carbon dioxide into a pocket area of a carcass in order to reduce the temperature of this carcass area from the inside and outwardly toward its external surface to thereby substantially reduce the development of pale, soft and exudative conditions within the meat of the carcass. The tool includes a spear blade to access the pocket area and an assembly which automatically moves the solid coolant into the pocket area.

U.S. Pat. No. 5,085,615, incorporated by reference hereinto, describes reducing the development of pale, soft and exudative muscle in pork and the like by chilling the carcass area to be treated from the inside out. By this approach, a thick portion of a carcass, such as the ham portion of a hog carcass, is slit such that an incision is made in order to form a pocket area in the carcass. A quantity of solid carbon dioxide or dry ice is then inserted into the pocket, and the pocket is allowed to close. The solid carbon dioxide sublimes, at which time the temperature throughout the ham portion is thus reduced to levels at which pale, soft and exudative (PSE) muscle development is significantly controlled.

That patent describes slitting so as to open or form the pocket and then inserting dry ice into the thus formed pocket. No particular mechanism or specific tool for achieving these functions is disclosed. It will be appreciated that hand slitting or manual slashing of these insertion pockets with a knife on a repetitive basis is tedious and can require the skill of an artisan, which can be a requirement that is difficult to fill in the context of a high-volume meat processing facility. In addition, manual slashing operations are susceptible to inadvertent variations in slash location and/or length; for example, often the slashes inadvertently do not coincide with at least a portion of the seam between muscles causing portions of these muscles to be severed and thus wasted, which adds an objectionable amount of cost to the product. Furthermore, height, depth, length, angle and shape of the carcass pocket are each dependent on the slashing stroke executed by the person opening each pocket, which leads to a wide variation in pocket geometry. This causes variations in the PSE reduction process, which is a process that is to be reasonably well-controlled in order to maintain consistent PSE reduction from carcass to carcass. Often, manually opened pockets are excessively large and expose large surfaces of meat unprotected by a membrane, resulting in leaching of nutrients, such as during water spraying in the cooler, as well as incomplete drainage of the sprayed water from the carcass. However, unless the pockets are slashed so as to be excessively large, manual insertion of the solid carbon dioxide materials is more difficult and can be accompanied by a certain risk of hand injury.

Even when the pockets are uniformly cut, and putting aside the difficulties of manual insertion of the solid carbon dioxide materials, it is very difficult to achieve uniform insertion of the solid coolant or dry ice materials. The positioning may vary from carcass pocket to carcass pocket, for example, dry ice bar insertions can be at different respective angles and even different insertion depths. These variables can also lead to further variations in the extent and effectiveness of PSE reduction. In addition, when the source of solid carbon dioxide is in the form of dry ice bars, typically it has been found to be necessary to cut a bevel on the leading end of the bar so as to facilitate its insertion into the slashed carcass pocket and lessen the risk of hand injuries.

Accordingly, there has developed a need for an approach which eliminates or significantly reduces these deficiencies. Especially important is an approach which will increase consistency in opening of the pocket and in accurately positioning the solid coolant and which will enhance the safety aspects of the PSE reduction procedure.

In summary, the present invention is a tool and method for inserting solid coolant material such as solid carbon dioxide or dry ice into a muscle area of an animal carcass or portion of an animal carcass. The insertion tool slits a proper sized opening and then quickly and positively places the coolant material into a carcass pocket that is thus accessed. Included is a spear blade at the leading end of the tool. A compartment for receiving and holding the coolant material is positioned behind the spear blade. When the spear blade is inserted, it forms a slit of the proper size, and an actuator on the tool is activated as a result of the spearing process. The actuator causes a ram assembly or the like to deposit the coolant material generally along the spear blade and into the proper position within the carcass cavity.

It is accordingly a general object of the present invention to provide a tool and method for inserting temperature-lowering material into a meat body.

Another object of the present invention is to provide an improved means for piercing an animal carcass or the like and for inserting solid "frozen" material into a pocket accessed or formed during the piercing operation.

Another object of this invention is to provide an improved hand-held tool which, after thrusting action by the operator, forms a slit in a carcass wall and automatically and substantially immediately inserts solid coolant material through the slit opening and into the carcass.

Another object of the present invention is to provide improved PSE treatment wherein the pocket is pierced to the same size and the same depth during each operation and from carcass to carcass.

Another object of this invention is to provide an improved insertion tool which forms a slit in a carcass wall that is consistently and uniformly sized to receive and pass therethrough a dry ice block or the like, the opening being neither excessively large so as to negatively impact on the meat nor too small so as to make insertion difficult and raise possible safety concerns.

Another object of the present invention is to provide an improved insertion tool which facilitates piercing through the approximate center of the muscle of the carcass so as to eliminate the need to coincide substantially fully with the seam between the muscles, yet avoiding severance of portions of the muscles, such as in the form of ribbons of muscle which represents waste, thereby avoiding an increase in the cost of the product.

Another object of the present invention is to provide an insertion approach in conjunction with a process for reducing PSE in meats, which insertion approach can be carried out by operators without requiring artisan skills and while improving the consistency of the operation.

Another object of this invention is to provide an improved insertion tool and method which accesses carcass pockets through a uniform piercing procedure and which inserts solid frozen material into the carcass in a manner that is uniform in depth, position, angle and timing.

Another object of this invention is to provide an insertion means that forms a pocket in a carcass which is substantially uniform in height, depth, length, shape and pocket geometry in general.

Another object of the present invention is to provide an improved insertion tool and method which exhibit enhanced safety attributes.

Another object of this invention is to provide a tool for inserting dry ice bars into a carcass which avoids the need for using beveled dry ice bars.

Another object of this invention is to provide an improved apparatus and method for inserting solid frozen materials including solid carbon dioxide in the form of bars, pellets, rice, as well as other materials which will rapidly lower the temperature of the carcass from the inside out for treating muscles including hams, pork loins, turkey breasts, beef muscles and the like.

These and other objects, features and advantages of the present invention will be clearly understood through a consideration of the following description.

BRIEF DESCRIPTION OF THE DRAWINGS

In the course of this description, reference will be made to the attached drawings, wherein:

FIG. 4 is a detailed elevational view, partially broken away, showing a step of the insertion procedure;

FIG. 5 is a partial longitudinal sectional view through a preferred actuator assembly which can be incorporated within the illustrated tool;

FIG. 6 is a top plan view of an alternative embodiment tool for facilitating insertion in accordance with this invention; and FIG. 7 is an elevational view of the embodiment shown in FIG. 6.

DESCRIPTION OF THE PARTICULAR EMBODIMENTS

Figure 1:
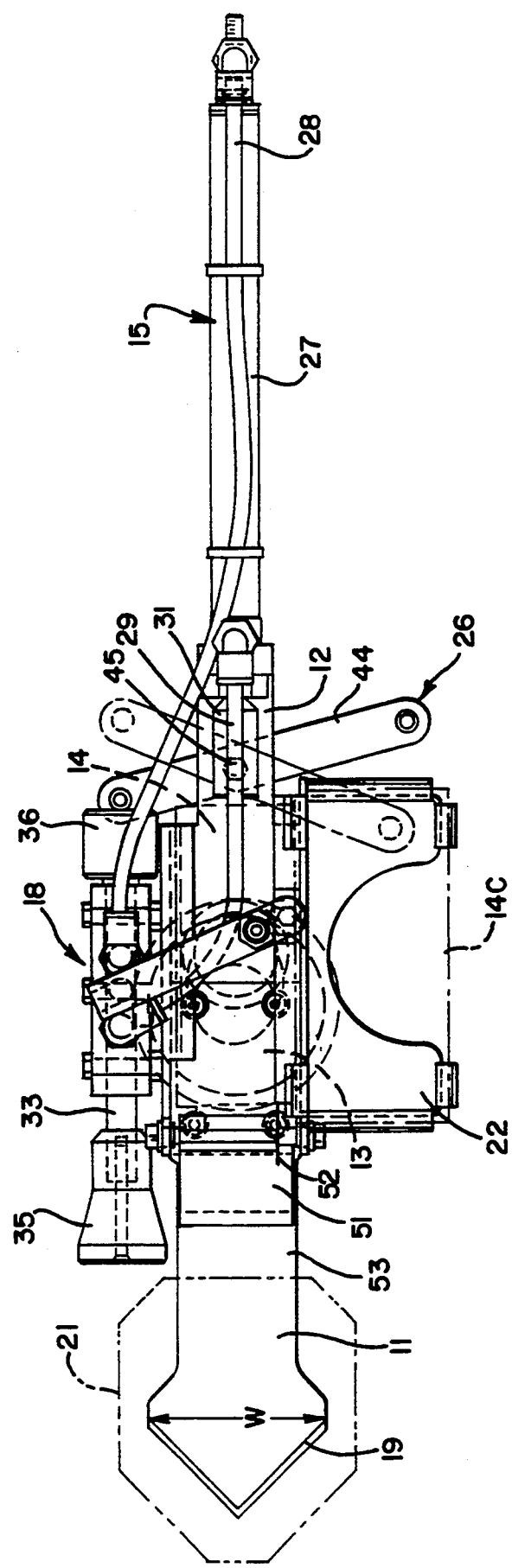
FIG. 1 is a top plan view of a preferred insertion tool in-accordance with the invention.

The tool assembly of the present invention is particularly well-adapted to be used on a carcass processing line for administering a solid coolant as part of a conditioning procedure which includes rapidly lowering the temperature within the inside of and throughout the muscle area treated. This procedure is accomplished so that the onset of pale, soft and exudative characteristics is substantially prevented. Further details in the regard are found in U.S. Pat. No. 5,085,615.

In this procedure for substantially preventing PSE characteristics, freshly killed carcasses are initially processed in a generally conventional manner, typically being suspended from an overhead trolley system of a generally known construction. At this time, the carcasses are usually placed within a cooler or chilling room, after which the carcasses are processed further in the usual and customary manner into finished meat products such as hams, pork muscle, turkey muscle, beef muscle and other cuts of meat. The invention is practiced as soon as possible after stun and before or immediately after carcasses are placed in a cooler thereby chilling the carcasses from the inside and outside simultaneously.

The tool assembly of the present invention is instrumental in the formation of a pocket within one or more locations of each carcass and the insertion of a solid refrigerant within that pocket. The solid refrigerant is important in carrying out the inside-out chilling which is described in further detail in said U.S. Pat. No. 5,085,615. The pocket area formed or accessed by use of the insertion tool is formed by piercing the carcass so as to form an incision proximate to the femur and at the hind leg muscle area of each carcass which, for example, is being processed for preparing hams. A pocket area is thereby formed within the hind leg portion of the carcass, which pocket area will tend to close while the carcass is suspended. When the pocket area is opened, the solid coolant is inserted therewithin by the tool, after which the pocket area will naturally close while the PSE treatment is initiated.

The solid coolant is to exhibit a high thermal absorption value at temperatures at which animal carcasses are processed. The preferred solid coolant or solid frozen material charge is solid carbon dioxide or dry ice. The solid coolant may be of a single piece having a size that is especially suitable for insertion within this pocket area. A bar shape has been found to be especially useful, for example one having a generally rectangular shape and a thickness of approximately one inch. An exemplary suitable dry ice bar or block is about five inches in length and about 2 inches in width, when for treating carcass ham areas. The solid coolant can also take the form of multiple, small bars or cubes, or a plurality of particles, such as a charge of solid coolant pellets, so-called rice-sized particles and/or powdered solid coolant or so-called snow.

It also should be understood that solid coolants other than carbon dioxide may be used and, if contact of such coolants with the meat is undesirable, these coolants may be enclosed in a package, vessel or envelope to isolate same from contact with the meat. Suitable solid coolants of this type include those which undergo a change in phase, including coolants that are liquid and that are solid when at a temperature suitable for use in connection with this invention. Also suitable as solid coolants are bars of material which do not undergo a change of phase while within the carcass. Included in this regard are cryogenically cooled bars of metal, for example stainless steel. Solid coolants of these types are advantageous because of their ability to be reused. Because they are reusable, it is more feasible economically to add more detail to their shapes, for example providing a beveled or wedge-shaped leading edge to facilitate insertion into the carcass cavity.

The preferred insertion tool illustrated in FIGS. 1 through 4 includes a thin spear blade 11 attached to a body or frame 12 having a compartment 13. A solid coolant charge is positioned within the compartment 13 for delivery by the tool upon its actuation. The illustrated solid coolant is a bar 14 of solid carbon dioxide or dry ice. A ram assembly 15 provides the impetus for movement of the bar 14 or the like out of the compartment 13 and into a pocket 16 of a carcass 17 (FIG. 4). An actuator assembly, generally designated as 18, activates the ram assembly 15 to move the solid coolant charge from out of the passageway and into the carcass pocket 16.

Blade 11 is made of a thin, rigid material, and it is secured to the body or frame 12 of the tool. Because of its frequent engagement with meat, stainless steel is the preferred material out of which the thin spear blade is made. Blade 11 is preferably substantially flat and may include a beveled leading edge or cutting edge 19. Its severing width "W" is selected so as to form a slit within the carcass that is properly sized to permit easy passage of the solid coolant through the slit while it is held open by the tool. This slit length can be tightly controlled and can be kept so small as to minimize opening a pocket that is excessively large and which could expose large surfaces of meat unprotected by a membrane, resulting in leaching of nutrients or other intercellular components by water spraying and incomplete drainage of sprayed water from the carcass. In part because of the relatively small slit formed by the spear blade 11, it is easier for the operator to pierce through the approximate center of the muscle, thereby avoiding the severing of muscle and resultant product damage and/or loss. A typical width W for the ham portion of a hog carcass is approximately 3 inches, typically between about 2.75 inches about 3.8 inches. These spear widths are typical for an average sized hog carcass and the range would be extended when used for treating beef or poultry carcasses, for example.

With further reference to the spear blade 11, its leading or cutting edge 19 is adjacent to, and typically terminates at, a shank portion 53. The shank portion 53, which is behind the leading edge 19, is necessarily narrower than the severing width "W" to enable the opener (discussed in greater detail hereinafter) to easily open up the slit which had just been formed by the piercing action of the cutting edge 19 to facilitate insertion of the solid coolant into the carcass. Typically, the blade shank width should be no wider than the width of the bar of solid coolant, for example, which often is about two inches for hams. A guard 21 (shown in phantom lines) can be provided for covering the spear blade when not in use.

In the illustrated embodiment, a magazine 22 is associated with and generally adjacent to the compartment 13. A plurality of solid coolant bars 14A, 14B, 14C are shown in phantom positioned within the magazine 22 in FIG. 2. In use, after solid coolant bar 14 has been displaced from the compartment 13 by operation of the insertion tool, the operator pushes, such as with a gloved left thumb, on the outwardly facing vertical edge of bottom block 14A, thereby horizontally sliding block 14A out of the magazine and into the compartment 13. By the force of gravity, the solid coolant bars 14B, 14C which remain within the magazine 22 drop down so that solid coolant bar 14B is in position for moving into the compartment after bar 14A has been inserted into the carcass cavity.

It will be appreciated that a handle or hand grip 23 will be grasped by the operator in order to hold the tool during use. A thermal insulator 24 and a polymer pad 25 may be included in order to help protect the operator's hand. The particular version of the insertion tool which is illustrated in these drawings is for right-hand operation. Normally the operator would grasp the hand grip in the right hand. The magazine can then be operated most easily with the left hand, as can a cocking lever 26 (when provided), which is discussed in greater detail hereinafter. When it is desired to have the device be more suitable for use by a left-handed person, these various components are generally reversed in mirror-image fashion.

Ram assembly 15 preferably includes a double-acting cylinder 27 of generally known construction. A suitable cylinder 27 is a Bimba ® Model No. SR-06-9.00-D-W. Cylinder 27 is operated by two fluid lines, such as house air lines. They are rear fluid line 28 and front fluid line 29. Cylinder 27 is also equipped with a pusher 31, preferably made of a polymeric material, for operatively moving or engaging the solid coolant which is within the compartment 13 at any given time after loading. In operation, pressurization of the rear portion of the cylinder 27 and depressurization of the front portion of the cylinder will force the pusher 31 outwardly from the cylinder (to the left in FIG. 1). Pressurization of the front portion by flow of pressurized air or other fluid into and through the front fluid line 29 and depressurization of the rear portion of the cylinder 27 will cause the cylinder to retract the pusher 31 to move to the "ready" position that is shown in FIG. 1.

This operation of the double-acting cylinder 27 is carried by actuator assembly 18. Details of a preferred actuator assembly are shown in FIG. 5. Actuator assembly 18 includes a housing 32 within which is slidably mounted a rod 33. A plurality of O-rings 34 may be provided to insure that adequate friction is provided onto the rod 33 so that the rod 33 remains where it had been positioned until it is positively acted upon. A bumper trigger 35 is located at one end of the rod 33. Preferably, a receptor block 36 is positioned at the other end of the rod 33. House air or the like is supplied to the actuator 18 by way of an air connector 37. In the illustrated actuator, house air enters same through center port 38 (FIG. 5). Rear fluid line 28 communicates with a rear port 39, and front fluid line 29 communicates with a front port 40. Channels are positioned along the rod 33 in order to provide pressurized air communication between center port 38 and either of rear port 39 or front port 40. In the position shown in FIG. 5, channels 41 permit pressurized house air passing through central port 38 to enter rear port 39, rear fluid line 28 and thus the rear portion of the double-acting cylinder 27. At the same time, front port 40 is open to exhaust, such as through vent 42, which preferably directs exhaust air away from the carcass, as well as from the operator. When this position is attained, the cylinder extends the pusher 39 outwardly and into the compartment 13. A corresponding flow path occurs between center port 38 and front port 40, with exhaust being through vent 43, when the actuator bumper trigger 35 is extended to the right (as viewed in FIG. 5).

Cocking lever assembly 26 is optionally provided in order to assist the operator in returning the actuator assembly 18 from the position shown in FIG. 5 to the position shown in FIG. 1. Illustrated cocking lever assembly 26 includes a lever arm 44 mounted along pivot rod 45. An engagement member such as finger 46 (FIG. 3) projects from lever arm 44 for engaging the receptor block 36. A lever handle 47 is provided to assist the operator in grasping the cocking lever assembly 26 so as to "cock" or return the actuator assembly 18 and the double-acting cylinder 27 to their respective "ready" positions so that a fresh supply of solid coolant can be inserted into the compartment 13.

An opener gate 51 assists in ensuring proper insertion of the solid coolant charge into the carcass pocket 16.

When opened as generally shown in FIG. 4, the opener gate 51 cooperates with the spear blade 11 to provide a guide ramp function to substantially prevent any possible hang-ups on the lip or entry surfaces of the carcass pocket during initial insertion. The blade shank 53 and opener gate 51 cooperate to form a path opening which is approximately as wide as the bar of solid coolant, for example. A suitable torsion spring 52 engages the opener gate 51 in order to close the gate when the tool is in its "ready" mode. This helps to prevent early discharge of solid coolant from the compartment.

A counterbalance system adapter 55 and quick-disconnect air coupler 56 can be included in order to facilitate easily connecting or disconnecting the insertion tool from a counterbalancing device (not shown). Coupler 56 permits the operator to uncouple the fluid driving source, such as house air, and the counterbalancing device in one motion. The counterbalancing device ergonomically enhances the handling of the insertion tool. These devices are generally referred to as load levelers which counterbalance the weight of the tool by the use of a tension adjustable unit. A suitable load leveler is available from Aero-Motive Sales, of Kalamazoo, Mich., an especially suitable load leveler for this particular tool being identified by Catalog No. RF6.

Figure 2:
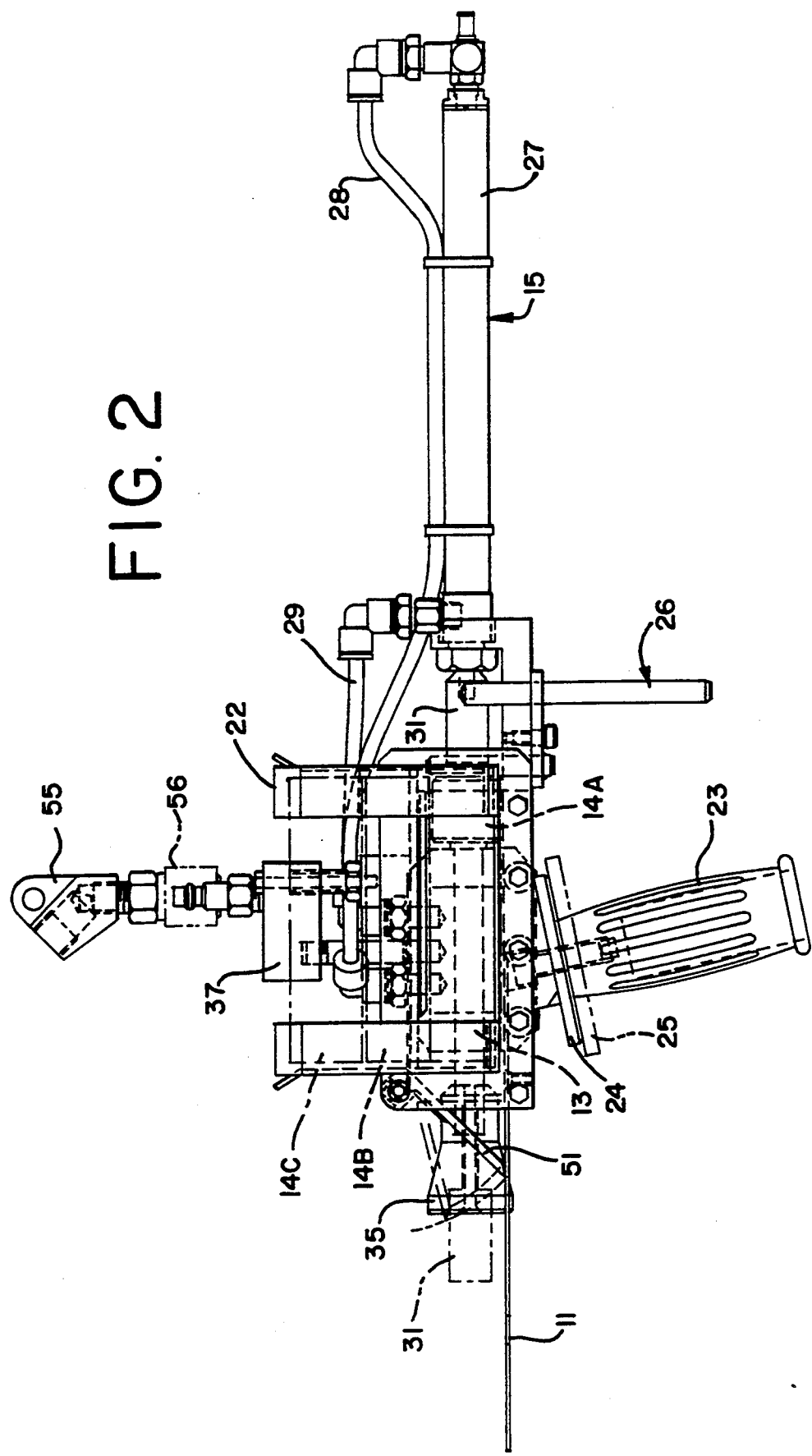
FIG. 2 is an elevational view from one side of the tool shown in FIG. 1.
Figure 3:
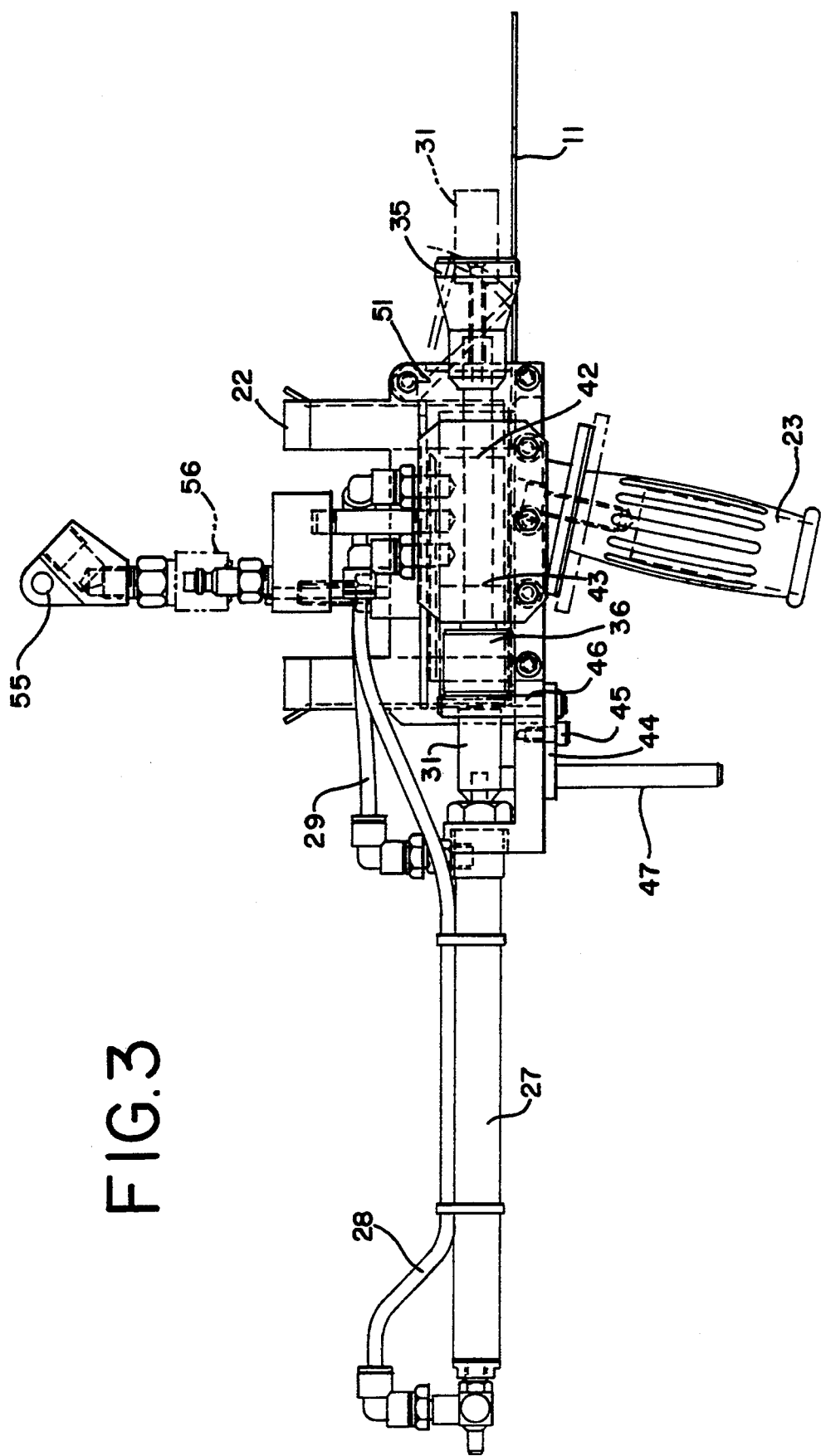
FIG. 3 is an elevational view similar to FIG. 2, but of the opposite side of the tool.

In operation, the operator will grasp the inserter tool by its hand grip 23 and orient it generally horizontally, such as shown in FIG. 2. The device at this stage will be in the cocked or ready position such as shown in FIG. 1. In the illustrated method, a solid coolant bar 14 is slid into the compartment 13, such as by way of the magazine 22 by pushing the bottommost bar and sliding it into the magazine. The insertion tool is then ready for operation.

The operator locates the flat spear blade 11 at the proper location on the carcass and pushes the spear into the muscle in order to access and/or form the carcass pocket. Once the pocket is thus opened, the bumper trigger 35 engages the outside surface of the carcass to push the rod 33 of the actuator assembly away from the carcass and toward the operator. By a suitable valving operation as discussed herein, the actuator assembly causes the double-acting cylinder 27 to move away from the operator and toward the carcass in the operational leading direction. This causes the solid coolant 14 to begin to move out of the compartment, at which time the leading portion of the solid coolant engages the opener gate or ramp as shown in phantom in FIGS. 2 and 3 and as shown in FIG. 4. This opener gate spreads the slit which had been made by the spear blade to thereby facilitate entry of the solid coolant charge into the carcass cavity such that solid coolant does not hang-up or stick on a lip or edge of the slit incision or cavity opening. A sufficiently large gap is thus opened at the mouth of the incision. The solid coolant charge is pushed totally out of the compartment and slides between the flat spear blade 11 and the opened gate or ramp 51 so as to provide a smooth transition through the slit and into the carcass cavity.

In the preferred embodiment, the stroke length of the double-acting cylinder is in excess of that needed to insert the solid coolant fully into the pocket. This additional stroke length effectively automatically removes the insertion tool without any substantial possibility of dragging the solid coolant out of place. This is because the additional stroke causes the ram assembly to push against the fully inserted solid coolant in order to rapidly push or recoil the insertion tool and its spear blade out of the pocket while the pusher 31 holds the solid coolant in place within the cavity.

At this stage, the actuator tool is in its deployed or "spent" condition. The actuator assembly is retracted as shown in FIG. 5, the double-acting cylinder and its pusher are extended as generally shown in FIG. 4 and in phantom in FIGS. 2 and 3, and the lever assembly 26 is in its released orientation shown in phantom in FIG. 1. In order to clear the way for another solid coolant charge to enter the compartment 13, the operator pulls on the lever handle 47 to thereby push on the receptor block 36 which operates the actuator assembly to retract the pusher 31 to its location such as shown in FIG. 1. The actuator tool is thus cocked or put into its "ready" condition, and the operator is free to move another solid coolant charge into the compartment.

With reference to the embodiment illustrated in FIGS. 6 and 7, this is an alternative embodiment for facilitating insertion of a solid coolant charge according to the invention. This tool pierces a slit or pocket in muscle of an animal carcass wherein the slit is reliably made to the prescribed width and prescribed length or depth. The tool is comprised of a spear 11A having a cutting leading edge portion 19A which has a selected width that pierces a slit of a prescribed width. Such prescribed width typically substantially corresponds to, or is slightly larger than, the width of a bar of solid coolant to be inserted into the thus formed slit. Spear 11A also has a selected length or penetrating depth which pierces the slit to a prescribed depth or length which generally corresponds to the length of the bar of solid coolant. The slit thus formed is sized to easily but closely accommodate insertion of this bar thereinto.

A grip member 23A is rigidly secured to the spear 11A such as by bolts, rivets or the like. Grip member 23A is for manually gripping and thrusting the tool into the carcass so as to form the slit as described herein.

It will be understood that the embodiments of the present invention which have been described are illustrative of some of the applications of the principles of the present invention. Numerous modifications may be made by those skilled in the art without departing from the true spirit and scope of the invention.

We claim:

1. A tool for inserting a solid coolant charge into a carcass muscle area of an animal carcass or portion thereof, the insertion tool comprising:
   a compartment for receiving and holding a charge of solid coolant;
   a spear blade rigidly positioned with respect to a leading end portion of said compartment;
   a thruster for moving the insertion tool into the carcass muscle area to thereby insert the spear blade into the muscle area, form a slit in the muscle area and access a carcass pocket within the animal carcass or portion thereof;
   an actuator assembly that is triggered by the action of said spear blade being inserted into the carcass muscle area; and
   a ram assembly in operative communication with said actuator assembly, which ram assembly moves the solid coolant charge from out of the compartment and into the carcass pocket in response to actuation thereof by said actuator assembly.

2. The insertion tool in accordance with claim 1, further including an opener gate assembly mounted generally adjacent to said leading end portion of said compartment, which opener gate assembly includes a gate member that is engaged by the solid coolant charge as same exits the compartment to thereby move the gate member within the slit in the carcass muscle area.

3. The insertion tool in accordance with claim 2, wherein the gate member of said opener gate assembly has a predetermined length that engages the slit in the carcass muscle area and assists in opening the slit so as to facilitate passage of the solid coolant charge through the slit and into the carcass pocket.

4. The insertion tool in accordance with claim 3, wherein said gate member is swingably mounted and is moved by the solid coolant charge from a generally closed position to a position generally parallel to said spear blade.

5. The insertion tool in accordance with claim 3, wherein said spear blade has a cutting leading edge portion having a selected width that pierces a slit of a desired width and a narrower shank portion having a width substantially equal to a width of said solid coolant charge, whereby said narrower shank portion facilitates opening of said slit in the carcass muscle area by said opening gate.

6. The insertion tool in accordance with claim 1, wherein the spear blade is substantially flat and is in general alignment with a bottom wall of said compartment.

7. The insertion tool in accordance with claim 2, wherein the spear blade is substantially flat and is generally parallel to a bottom wall of said compartment, and wherein said spear blade and said gate, when open, combine to provide a feed ramp pathway for the solid coolant charge through the opened slit and into the carcass pocket.

8. The insertion tool in accordance with claim 7, wherein said spear blade has a cutting leading edge portion having a selected width for piercing a slit of a predetermined width substantially equal to the width of said solid coolant charge, whereby said narrower shank portion facilitates opening of the slit in the carcass by said opener gate.

9. The insertion tool in accordance with claim 1, wherein the actuator assembly includes a movable member which is moved by engagement between the actuator assembly and the animal carcass or portion thereof, which movable member actuates the ram assembly so as to extend a pusher thereof into and through said compartment.

10. The insertion tool in accordance with claim 1, wherein said ram assembly is rigidly positioned with respect to an end of said compartment that is opposite to said spear blade, and said ram assembly includes a pusher component which, upon actuation of the ram assembly, passes into and through said compartment.

11. The insertion tool in accordance with claim 1, wherein said actuator assembly includes a fluid operating valve assembly which directs pressurized fluid from a source thereof to said ram assembly, said spear blade having a cutting edge, said actuator assembly having a bumper trigger that is positioned generally adjacent to said spear blade and behind the cutting edge thereof, whereby said bumper trigger engages the animal carcass or portion thereof upon insertion of the spear blade thereinto in order to activate the valve assembly so that the pressurized fluid effects movement of a rod of the ram assembly to thereby automatically eject the solid coolant charge out of the compartment and into the carcass pocket.

12. The insertion tool in accordance with claim 1, wherein said actuator assembly includes a valve assembly having a slidable rod mounted within a housing having multiple ports, said rod having channels for selectively communicating two of said ports with each other while communicating a third one of said ports to an exhaust vent, whereby pressurized fluid source is transmitted from a pressurized fluid to one end of said ram assembly while exhausting fluid from an opposite end of said ram assembly.

13. The insertion tool in accordance with claim 1, wherein the solid coolant is an elongated bar of solid carbon dioxide, said compartment is generally rectangular in cross-section, and said compartment has a longitudinal axis that is generally parallel to said spear blade.

14. The insertion tool in accordance with claim 1, wherein the solid coolant is a material having a high thermal absorptive value, said material being within an envelope suitable for contact with the carcass muscle area.

15. The insertion tool in accordance with claim 1, wherein the solid coolant is a solid material which does not undergo a phase change while within the carcass muscle area and which is at a temperature below room temperature when initially inserted into the carcass muscle area.

16. The insertion tool in accordance with claim 1, further including a magazine for holding a plurality of said solid coolant charges and selectively supplying same to and into said compartment.

17. The insertion tool in accordance with claim 1, wherein said thruster includes a grip member for manually grasping the insertion tool.

18. A method for inserting a charge of solid coolant into a carcass muscle area of an animal carcass or portion thereof, said method comprising the steps of:
providing an insertion tool having a compartment for receiving and holding a charge of solid coolant, a spear blade positioned forwardly thereof, a ram assembly, and an actuator for the ram assembly;
loading at least one charge of solid coolant into the compartment of the insertion tool;
inserting the spear blade into a carcass muscle area of an animal carcass or portion thereof in order to thereby access a pocket area within the carcass muscle area;
continuing with said inserting step, including automatically actuating the ram assembly;
said step of automatically actuating the ram assembly effecting a step of moving the solid coolant charge out of the compartment and into the pocket of the carcass muscle area; and
withdrawing the insertion tool from the pocket of the carcass muscle area while leaving the solid coolant charge in place within the pocket.

19. The method in accordance with claim 18, wherein said inserting step includes guiding the solid coolant charge out of the compartment and into the pocket of the carcass muscle area, said guiding step including sliding the solid coolant charge along the spear blade.

20. The method in accordance with claim 18, wherein said inserting step includes guiding the solid coolant charge out of the compartment and into the pocket of the carcass area, said guiding step including sliding the solid coolant charge along the spear blade and along an opener wall that selectively provides a ramp surface between the compartment and the pocket.

21. The method in accordance with claim 20, wherein said guiding step includes positioning the spear blade and the opener wall so as to be generally parallel to each other during the time that the solid coolant charge passes between the compartment and the pocket.

22. The method in accordance with claim 18, wherein said automatic actuating step includes engaging a bumper trigger with the animal carcass or portion thereof so as to automatically activate the ram assembly to effect said inserting step.

23. The method in accordance with claim 18, wherein said inserting step is preceded by manually grasping a grip portion of the insertion tool.

24. The method in accordance with claim 18, wherein said step of automatically actuating the ram assembly develops a ram assembly stroke length that is in excess of a stroke length required to move the solid coolant charge fully into the carcass pocket so as to automatically initiate said withdrawing step.

25. The method in accordance with claim 18, wherein said charge of solid coolant includes solid carbon dioxide.

26. The method in accordance with claim 18, wherein said charge of solid coolant includes a material having a high thermal absorptive value, which material is encased within an envelope made of a material suitable for contact with the carcass muscle area.

27. The method in accordance with claim 18, wherein said charge of solid coolant is at a temperature below room temperature when initially inserted into the carcass muscle area and does not undergo a phase change while within the carcass muscle area.

28. A tool and solid coolant charge combination, comprising:

a solid coolant charge for insertion into a carcass muscle area of an animal carcass or portion thereof, the solid coolant charge being in the form of a bar having a prescribed length and a prescribed width a tool including a spear blade having a cutting leading edge portion which has a selected transverse width that, when the spear blade is thrust into a carcass muscle area, pierces a slit of a size which approximates the prescribed width of the coolant charge bar; said spear blade further having a selected length that, when the spear blade is thrust into a carcass muscle area, the slit thus pierced has a selected depth which approximates the prescribed length of the coolant charge bar; and a grip member rigidly positioned with respect to the spear blade such that, when the grip member is manually grasped, the spear blade is positioned for thrusting the tool into the carcass muscle area.

29. The combination in accordance with claim 28, wherein said spear blade is substantially flat.

30. The combination in accordance with claim 28, wherein said solid coolant charge is an elongated bar of solid carbon dioxide.

31. The combination in accordance with claim 28, wherein said solid coolant charge bar is a material of high thermal absorptive value, said material being within an envelope suitable for contact with the carcass muscle area.

32. The combination in accordance with claim 28, wherein said solid coolant charge bar is a material of high thermal absorptive value, said material not undergoing a phase change while within the carcass muscle area.

* * * * *

UNITED STATES PATENT AND TRADEMARK OFFICE
CERTIFICATE OF CORRECTION

PATENT NO. : 5,413,526
DATED : May 9, 1995
INVENTOR(S) : Norman C. Abler, Gary R. Skaar and William Paulos It is certified that error appears in the above-indentified patent and that said Letters Patent is hereby corrected as shown below:

Col. 1, line 61, "materials" should read --material--.
Col. 3, line 35, delete the hyphen after "in".
Col. 5, line 26, insert --and-- after "2.75 inches".
Col. 12, line 4, insert a semicolon --;-- after "width".

Signed and Sealed this

Twentieth Day of August, 1996

Attest:

BRUCE LEHMAN

Attesting Officer

Commissioner of Patents and Trademarks